US010498464B2

(12) United States Patent
Graceffo et al.

(10) Patent No.: US 10,498,464 B2

(45) Date of Patent: Dec. 3, 2019

(54) SYSTEMS AND METHODS FOR CONCEALING WAVEFORM PROPERTIES

(71) Applicant: RAYTHEON COMPANY, Waltham, MA (US)

(72) Inventors: Gary M. Graceffo, Burke, VA (US); Benjamin P. Dolgin, Alexandria, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/002,680

(22) Filed: Jun. 7, 2018

(65) Prior Publication Data

US 2018/0367223 A1 Dec. 20, 2018

Related U.S. Application Data

(60) Provisional application No. 62/521,674, filed on Jun. 19, 2017.

(51) Int. Cl.

| | |
|---|---|
| ***H04B 10/85*** | (2013.01) |
| ***H04B 10/11*** | (2013.01) |
| ***H04B 10/112*** | (2013.01) |
| ***H04B 10/07*** | (2013.01) |
| ***H04B 10/67*** | (2013.01) |
| ***H04B 10/556*** | (2013.01) |
| ***H04B 10/54*** | (2013.01) |
| ***H04B 10/50*** | (2013.01) |
| ***H04B 10/60*** | (2013.01) |

(52) U.S. Cl.

CPC ......... *H04B 10/85* (2013.01); *H04B 10/0705* (2013.01); *H04B 10/11* (2013.01); *H04B 10/1129* (2013.01); *H04B 10/50* (2013.01); *H04B 10/541* (2013.01); *H04B 10/5561* (2013.01); *H04B 10/5563* (2013.01); *H04B 10/60* (2013.01); *H04B 10/677* (2013.01)

(58) Field of Classification Search

CPC ............ H04B 10/0705; H04B 10/1129; H04B 10/541; H04B 10/5563; H04B 10/677; H04B 10/85; H04B 10/11; H04B 10/50; H04B 10/5561; H04B 10/60

See application file for complete search history.

(56) References Cited

U.S. PATENT DOCUMENTS

2004/0142696 A1* 7/2004 Saunders ............... H04B 1/715 455/450
2014/0308039 A1* 10/2014 Sun ..................... H04L 27/3444 398/79

(Continued)

*Primary Examiner* — Ted M Wang
(74) *Attorney, Agent, or Firm* — Lando & Anastasi, LLP

(57) ABSTRACT

Aspects are generally directed to free-space transmitters, free-space receivers, and free-space communication methods. In one example, a free-space communication method includes acts of mapping a data payload to one or more symbols based on a symbol set defined by a digital modulation scheme, varying one or more properties of a signal waveform to phase modulate the signal waveform with the data payload, the one or more symbols each having a symbol duration that defines a timing structure of the modulated signal waveform, and fragmenting the timing structure of the modulated signal waveform to conceal one or more waveform properties of the modulated signal waveform.

16 Claims, 7 Drawing Sheets

(56) References Cited

U.S. PATENT DOCUMENTS

| | | | |
|---|---|---|---|
| 2018/0054259 | A1 | 2/2018 | Kowalevicz et al. |
| 2018/0091227 | A1 | 3/2018 | Dolgin et al. |
| 2018/0091228 | A1 | 3/2018 | Kowalevicz et al. |
| 2018/0091230 | A1 | 3/2018 | Dolgin et al. |
| 2018/0091232 | A1 | 3/2018 | Dolgin et al. |
| 2018/0102853 | A1 | 4/2018 | Dolgin et al. |
| 2018/0145764 | A1 | 5/2018 | Dolgin et al. |
| 2018/0145765 | A1 | 5/2018 | Kowalevicz et al. |
| 2018/0167145 | A1 | 6/2018 | Dolgin et al. |
| 2018/0234231 | A1 | 8/2018 | Dolgin et al. |
| 2018/0367223 | A1 | 12/2018 | Graceffo et al. |
| 2019/0007091 | A1 | 1/2019 | Graceffo et al. |
| 2019/0158208 | A1 | 5/2019 | Dolgin et al. |

* cited by examiner

SYSTEMS AND METHODS FOR CONCEALING WAVEFORM PROPERTIES

CROSS-REFERENCE TO RELATED APPLICATION

This application claims priority under 35 U.S.C. § 119(e) to U.S. Provisional Application Ser. No. 62/521,674, titled "SYSTEMS AND METHODS FOR CONCEALING WAVEFORM PROPERTIES," filed on Jun. 19, 2017, which is hereby incorporated herein by reference in its entirety.

BACKGROUND

Transmissions (e.g., optical or radio-frequency waveforms) used in traditional free-space communications inherently achieve a certain level of privacy. However, in many situations, it is still possible to intercept these free-space transmissions using a conventional coherent or non-coherent receiver. For example, a conventional coherent receiver can be placed between the transmitter and the intended recipient, behind the intended recipient, or slightly off-axis from the intended recipient to intercept the free-space communications.

In an attempt to prevent the data in a transmission from being surreptitiously obtained, various approaches have been proposed for protecting the data within a free-space transmission. Two examples of these techniques are encryption and obfuscation. For instance, some examples of typical encryption techniques are the Advanced Encryption Standard (AES) specification and the RSA cryptosystem. In contrast to typical encryption techniques, which encode the transmitted data, obfuscation techniques generally obfuscate a data payload with noise using techniques such as spread spectrum and Gaussian Dither modulation. While these techniques for concealing data aim to prevent message recovery from an intercepted transmission, they do not prevent the transmission (i.e., the transmitted waveform) from being intercepted.

SUMMARY

Aspects and embodiments are generally directed to systems and methods for concealing the waveform properties of an optical or radio-frequency free-space transmission. In particular, examples of the systems and methods described herein aperiodically modulate a coherent waveform to remove the symmetry necessary for conventional receivers to detect the signal. For example, methods may include adjusting one or more symbol period durations within the signal waveform, and/or inserting one or more false symbols within the signal waveform. As a result of adjustments to the duration of a symbol period, and/or the addition of one or more false symbols, an intercepting receiver will incorrectly recover the symbols within the signal waveform, or fail to recover a symbol clock, and therefore, be unable to detect the presence of the signal. Accordingly, various examples of the systems and methods described herein provide an increased level of security for free-space communications that is not available with current systems and techniques.

According to an aspect, provided is a free-space communication method. In one example, the method comprises mapping a data payload to one or more symbols based on a symbol set defined by a digital modulation scheme, varying one or more properties of a signal waveform to phase modulate the signal waveform with the data payload, the one or more symbols each having a symbol duration that defines a timing structure of the modulated signal waveform, and fragmenting the timing structure of the modulated signal waveform to conceal one or more waveform properties of the modulated signal waveform.

According to various examples, fragmenting the timing structure of the modulated signal waveform includes adjusting the symbol duration of at least one of the one or more symbols. In certain examples, the method further comprises receiving an input from at least one of a random number generator, an encryptor, and a predetermined aperiodic timing sequence, and fragmenting the timing structure of the modulated signal waveform includes randomly adjusting the symbol duration of the at least one of the one or more symbols based on the input.

In various other examples, fragmenting the timing structure of the modulated signal waveform includes inserting one or more false symbols in the data payload. In certain examples, the method further comprises receiving an input from at least one of a random number generator, an encryptor, and a predetermined aperiodic timing sequence, and fragmenting the timing structure of the modulated signal waveform includes randomly inserting the one or more false symbols in the data payload based on the input.

According to various examples, the method further comprises transmitting the modulated signal waveform, and the modulated signal waveform is an optical transmission. In various examples, the method further comprises receiving the modulated signal waveform, converting the modulated signal waveform to an intensity-encoded optical signal, and recovering the one or more symbols based at least in part on the intensity-encoded optical signal. The method may further comprise converting the intensity-encoded optical signal to a digital signal that includes a plurality of intensity samples. In various examples, recovering the one or more symbols includes identifying and removing one or more of the plurality of intensity samples that correspond to a false symbol or a symbol having an adjusted symbol duration.

According to another aspect, provided is a free-space transmitter. In one example, the free-space transmitter comprises an input configured to receive a data payload, a mapping module configured to map the data payload to one or more symbols based on a symbol set defined by a digital modulation scheme, a modulator coupled to the mapping module and configured to vary one or more properties of a signal waveform to phase modulate the signal waveform with the data payload, the one or more symbols each having a symbol duration that defines a timing structure of the modulated signal waveform, and a fragment timing module coupled to the modulator and configured to fragment the timing structure of the modulated signal waveform to conceal one or more waveform properties of the modulated signal waveform.

In various examples, the fragment timing module is configured to adjust the symbol duration of at least one of the one or more symbols to fragment the timing structure of the modulated signal waveform. In certain examples, the fragment timing module includes at least one of a random number generator, an encryptor, and a predetermined aperiodic timing sequence. In certain examples, the fragment timing module is configured to randomly adjust the symbol duration of the at least one of the one or more symbols based on an input from the at least one of the random number generator, the encryptor, and the predetermined aperiodic timing sequence.

In various other examples, the fragment timing module is configured to insert one or more false symbols in the data payload to fragment the timing structure of the modulated signal waveform. In certain examples, the fragment timing module includes at least one of a random number generator, an encryptor, and a predetermined aperiodic timing sequence. In certain examples, the fragment timing module is configured to randomly insert the one or more false symbols in the data payload based on an input from the at least one of the random number generator, the encryptor, and the predetermined aperiodic timing sequence. In certain examples, the modulated signal waveform is one of an optical transmission and a radio-frequency transmission.

According to another aspect, provided is a free-space receiver. In one example, the free-space receiver comprises an optical element positioned to receive a phase modulated signal waveform, the phase modulated signal waveform having a fragmented timing structure that conceals one or more waveform properties of the phase modulated signal waveform, a demodulator coupled to the optical element and configured to demodulate the phase modulated signal waveform, a phase recovery module configured to identify one or more phase changes in the demodulated signal waveform, a timing recovery module configured to provide fragment timing data descriptive of the fragmented timing structure of the phase modulated signal waveform, and a symbol recovery module configured to recover one or more symbols from the demodulated signal waveform based on at least the identified one or more phase changes and the fragment timing data.

According to various examples, the fragmented timing structure is based on an adjusted symbol duration of at least one of the one or more symbols. In various other examples, the fragmented timing structure is based on at least one false symbol in a data payload of the phase modulated signal waveform. In certain examples, the demodulator includes an optical resonator assembly positioned to receive the phase modulated signal waveform from the optical element, the optical resonator assembly being configured to convert the received phase modulated signal waveform to at least one intensity-encoded optical signal.

According to various examples, the free-space receiver comprises an analog-to-digital converter configured to generate a digital signal based on the intensity-encoded optical signal, the digital signal including a plurality of intensity samples, and the symbol recovery module is configured to identify and remove one or more of the plurality of intensity samples that correspond to the fragmented timing structure of the phase modulated signal waveform. In various examples, the removed one or more of the plurality of intensity samples correspond to at least one false symbol in a data payload of the phase modulated signal waveform or at least one symbol having an adjusted symbol duration.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
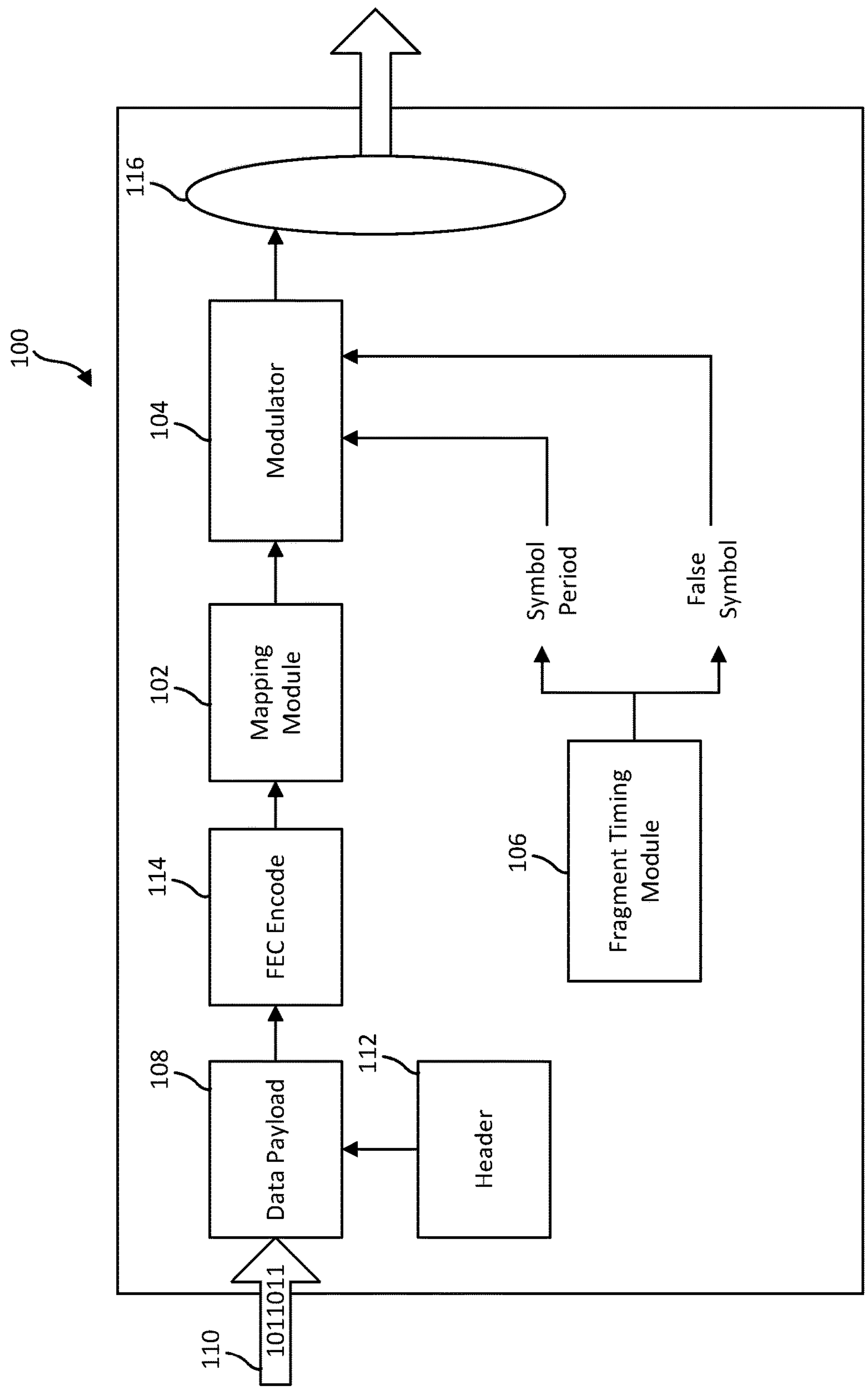
FIG. 1 is a functional block diagram of an optical transmitter according to various examples described herein.

Aspects and examples described herein are generally directed to methods and systems for concealing the waveform properties of a free-space transmission, such as an optical waveform or a radio-frequency waveform.

As discussed above, typical free-space communication techniques inherently achieve a base level of privacy. Nevertheless, it is still possible to intercept these transmissions using a typical receiver. While encryption techniques and obfuscation techniques offer a certain level of protection for the data payload (e.g., the contents of the transmitted signal waveform), they do not prevent the transmitted signal from being intercepted. Moreover, despite encryption techniques and obfuscation techniques, once a transmitted signal waveform has been intercepted, signal intelligence (SIGINT) techniques may be used to recover some, or all, of the encrypted or obscured data payload. In particular, once a transmitted signal waveform has been intercepted, SIGINT techniques may access waveform metadata such as sender identity, recipient identity, modulation type, symbol period, and symbol rate, to name a few examples.

Accordingly, various examples of the methods and systems described herein include steps or components that conceal the properties of a transmitted signal waveform to prevent surreptitious signal interception with a conventional receiver. That is, where conventional techniques conceal the data payload (e.g., the contents) of a transmitted signal waveform, various examples described herein conceal the properties of the transmitted signal waveform itself. As such, various aspects and examples offer an additional, or alternative, level of security for free-space communication systems. While described herein as overcoming the shortcomings of traditional data payload encryption and/or obfuscation techniques, particular examples of the techniques described herein may be combined with traditional encryption and/or obfuscation techniques to provide a free-space signal waveform that has both concealed data content and concealed waveform properties. Such an example offers the benefit of multiple layers of security.

It is to be appreciated that examples and/or embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more examples and embodiments are not intended to be excluded from a similar role in any other example or embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

The accompanying drawings are included to provide illustration and a further understanding of the various aspects and examples, and are incorporated in and constitute a part of this disclosure. The drawings, together with the remainder of the disclosure, serve to explain principles and operations of the described and claimed aspects and examples.

Most typical free-space communication receivers require stable timing in order to accurately perform demodulation processes for a received signal. For instance, Binary Phase-Shift Keying (BPSK) and Quadrature Phase-Shift Keying (QPSK) modulation schemes each require stable timing in order to accurately recover transmitted data from an encoded signal. While the following examples are described with reference to a BPSK modulation scheme, a differential BPSK, or a QPSK modulation scheme, the methods and systems described herein may apply to various other coherent digital signal modulation techniques. These techniques may include, but are not limited to, Quadrature Amplitude Modulation (QAM), M-ary, and M-PSK. Additionally, while not necessarily a coherent waveform, Intensity Modulation (IM) may also be supported by the methods and systems described herein.

During a BPSK transmission, a data payload is communicated to a receiver by modulating the phase of a reference signal (e.g., an optical carrier waveform or an RF carrier waveform). A BPSK modulated waveform is generally characterized by symmetrical phase transitions, a fixed symbol period, and an integer multiple of symbol periods between each phase change. For instance, if a symbol period has a duration of 1 nanosecond, for each successive symbol, the time between phase changes are integer multiples of 1 nanosecond. Accordingly, to recover an optical BPSK signal waveform, for example, a received signal waveform is mixed with a stable local oscillator (e.g., a stable laser) that down-converts the received signal waveform to a desired intermediate frequency. Using the stable local oscillator, the received signal waveform phase changes may be tracked over time, relative to a phase of the local oscillator, and the relative phase shifts may be resolved. Once the relative phase shifts have been resolved, various techniques may be used to recover the encoded data of the transmitted signal. Various aspects and examples described herein include systems and methods of operation that fragment the timing structure of a typical encoded signal waveform, such as a BPSK signal waveform, and thereby conceal the waveform properties of that signal. For at least this reason, such aspects and examples make a transmitted signal unrecoverable without knowledge of the process(es) used to fragment the timing structure of that signal.

Figure 2:
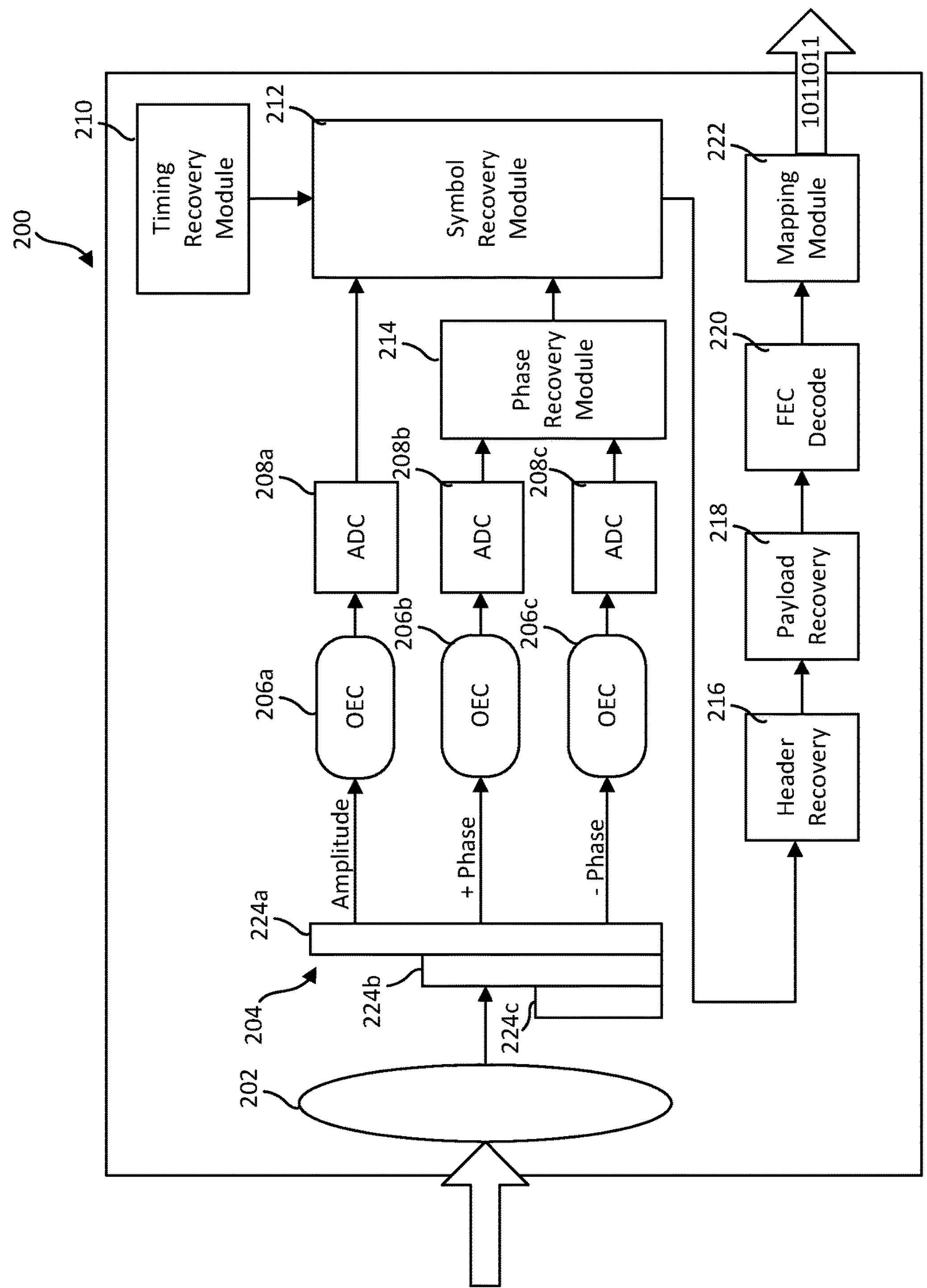
FIG. 2 is a functional block diagram of an optical receiver according to various examples described herein.

As further described below, examples of the systems for concealing signal waveform properties may include a transmitter that is configured to transmit a concealed signal waveform. In other examples, the systems described herein may include a receiver that is configured to receive a concealed signal waveform. In further examples, the systems described herein may be a communication assembly that includes both a transmitter and a receiver, or a transceiver. A functional block diagram of one example of a transmitter (e.g., optical transmitter 100) is illustrated in FIG. 1, and a functional block diagram of one example of a receiver (e.g., optical receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure. While FIG. 1 and FIG. 2 illustrate examples of an optical transmitter 100 and an optical receiver 200, respectively, the optical components shown therein may be replaced with RF components to provide a radio-frequency (RF) transmitter, an RF receiver, and/or an RF communication assembly.

Though the components of the example optical transmitter 100 shown in FIG. 1 and the optical receiver 200 shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, one or more specialized hardware components, or one or more specialized microprocessors executing software instructions (e.g., predefined routines). In particular, the software instructions may include digital signal processing (DSP) instructions. Unless otherwise indicated, signal lines between components of the optical transmitter 100, and between components of the optical receiver 200, may be implemented as discrete analog, digital, or optical signal lines. Some of the processing operations may be expressed in terms of calculations or determinations by the optical transmitter 100, the optical receiver 200, a controller, a processor, or other components. The equivalent of calculating and determining values, or other aspects, can be performed by any suitable analog or digital signal processing techniques and are included within the scope of this disclosure. Such techniques are further discussed with reference to the controller 500 described below with reference to FIG. 5. Unless otherwise indicated, control signals may be encoded in either digital or analog form.

Referring to FIG. 1, one example of an optical transmitter 100 may include an input 110, a mapping module 102, a modulator 104, and a fragment timing module 106, among various other components. The optical transmitter 100 may receive a data payload 108 at the input 110, which may include a discrete or continuous data stream (shown as a series of bits). The input 110 may include any hardware or software interface configured to receive a discrete or continuous data stream, such as a bus, a system interface, network interface, or other I/O component. Once received, the transmitter 100 may append a header 112 to the data payload 108. In various examples, the header 112 precedes the data payload 108 and may include data payload ordinality and cardinality information (relative to other data), among various other information. Once the optical transmitter 100 has assembled the data payload 108 and the appropriate header information, the optical transmitter 100 may apply a Forward Error Correction (FEC) code to the data payload 108. The transmitter 100 may include a FEC encode module 114 that implements FEC by adding redundancy to the data payload 108 with a block code or convolution code. For example, the FEC module 114 may repeat one or more bits within the data payload 108 to reduce an effect that the free-space transmission medium may have on the transmitted signal waveform. Accordingly, in various examples the optical transmitter 100 may include an FEC encode module 114 to control errors that may result from transmitting the data payload through a noisy medium. Once FEC is applied, the data payload 108 is provided to the mapping module 102 in preparation for the modulator 104.

In various examples the optical transmitter 100 implements a digital modulation scheme that conveys a data payload by modulating the phase of a carrier waveform. For instance, the optical transmitter 100 may implement a BPSK digital modulation scheme. The mapping module 102 converts each series of bits of the data payload 108 to a symbol set that is specified by the particular modulation scheme implemented by the optical transmitter 100, and converts those symbols to their respective constellation representation. For example, when implementing a BPSK digital modulation scheme, the mapping module 102 maps each bit to a respective symbol. However, when implementing other digital modulation schemes (e.g., QPSK digital modulation or QAM digital modulation), the mapping module 102 may map more than one bit to a symbol, and may generate a complex vector. As previously discussed, the mapping module 102 may implement various modulation schemes, such as but not limited to BPSK, QPSK, M-ary, and M-PSK, to name a few examples.

As illustrated in FIG. 1, once the mapping module 102 has processed the data payload 108, the symbol-mapped data payload is provided to the modulator 104. The modulator 104 receives the data payload 108 from the mapping module 102 and encodes the data payload 108 onto a carrier waveform (e.g., continuous sinusoidal waveform). In various examples, the modulator 104 may be an electro-optic modulator, and may include an optical source, such as a laser. In particular, the laser may emit a continuous carrier waveform that is modulated for each symbol of the data payload 108 to encode those symbols on the carrier waveform. However, in other examples, such as the discussed radio-frequency (RF) implementations, the modulator 104 may include other suitable modulators, such as a RF modulator having an RF source.

As further illustrated in FIG. 1, in various examples, the fragment timing module 106 may perform one or more operations that fragment the timing structure of the signal waveform (i.e., the encoded carrier waveform) and, therefore, conceal the waveform properties of the signal waveform. The fragment timing module 106 is coupled to the modulator 104 and communicates and interacts directly with the modulator 104, as illustrated in FIG. 1. For instance, the fragment timing module 106 may provide an input to the modulator 104 (e.g., the illustrated additional symbol period and/or false symbol) that conceals the waveform properties of the signal waveform. In particular, the fragment timing module 106 may aperiodically modulate the coherently encoded signal waveform to remove the symmetry necessary for conventional receivers to detect the signal waveform.

In various examples, the fragment timing module 106 may increase, randomly, the duration of a symbol period of the one or more of the symbols within the signal waveform. In such an example, the fragment timing module 106 may include a random number generator, an encryptor, and/or a manually generated aperiodic timing sequence that pseudo randomly generates a duration by which to extend the duration of a symbol period. While in certain examples, the period of each symbol within the signal waveform may be randomly extended, even a few adjustments may cause the symbol rate (and timing structure) of the signal waveform to appear aperiodic. The additional time added by the fragment timing module 106 to a symbol period may be less than or equal to an initial symbol period duration, and may be different (or the same) for each consecutive symbol period. Due to the aperiodic symbol rate of the manipulated signal waveform (e.g., the "concealed" signal waveform), a typical receiver will be unable to correctly recover the symbols and/or a symbol clock from the concealed signal waveform.

In certain other examples, the fragment timing module 106 may aperiodically modulate the signal waveform by adding one or more false symbols to the data payload 108. Each false symbol may have a randomly generated symbol period and may be randomly inserted in the data payload 108. Similar to the examples described above, in such an example, the fragment timing module 106 may include a random number generator, an encryptor, and/or a manually generated aperiodic timing sequence that pseudo randomly generates and inserts the false symbols in the data payload. False symbols may be added in-phase or out-of-phase with a phase of a genuine symbol, or anywhere in between. Information descriptive of the particular adjustments performed by the fragment timing module 106 is referred to herein as "fragment timing data". Fragment timing data may include information descriptive of the particular processes executed by the fragment timing module 106 to aperiodically modulate the signal waveform, and may include data such as the particular duration and placement of false symbols and/or duration by which a symbol period has been randomly adjusted (e.g., increased). As further described below, the fragment timing data may be used by the receiver (e.g., optical receiver 200) to demodulate and recover the data payload 108 after of the concealed signal waveform is received.

Once the fragment timing module 106 has processed the encoded carrier waveform to conceal the waveform properties of the signal waveform, the optical transmitter 100 may transmit the signal waveform (e.g., in a direction of a receiver). In various examples, the optical transmitter 100 may include one or more optical elements 116, such as one or more mirrors or lenses, which direct the signal waveform in the direction of the receiver.

Figure 5:
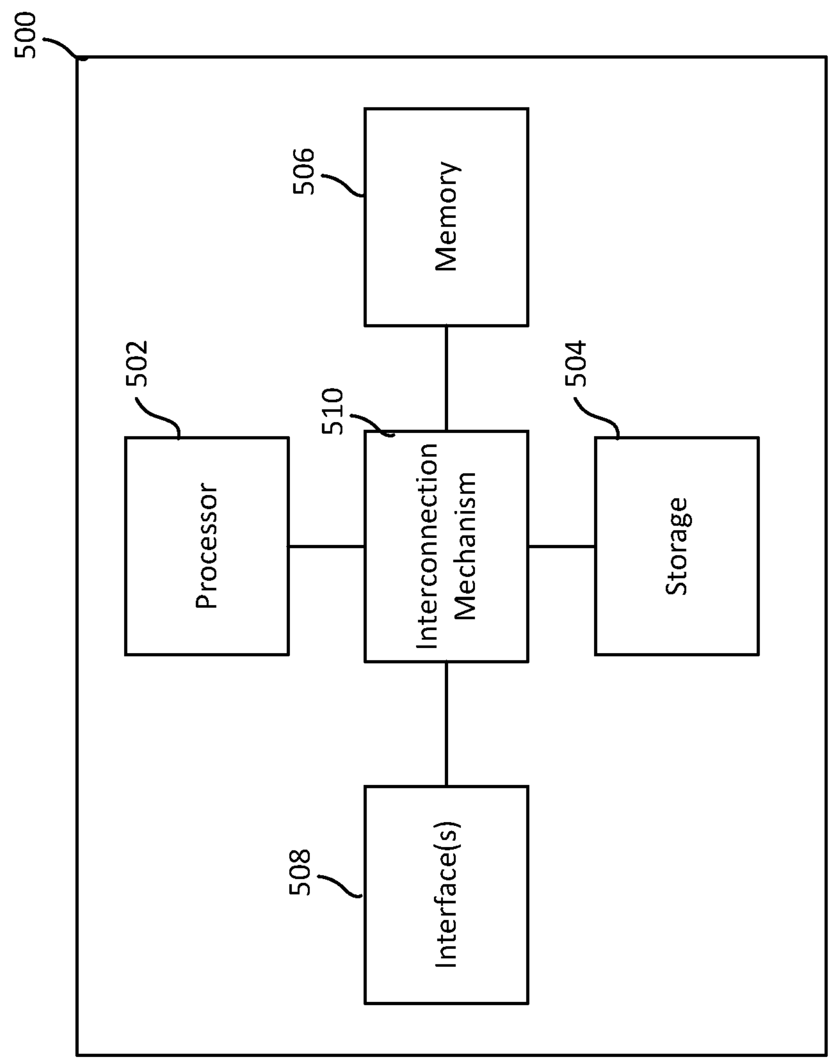
FIG. 5 is a functional block diagram of an example of a controller configured to implement various examples of the processes described herein.

As further discussed herein with reference to at least the processor 502 illustrated in FIG. 5, various components of the transmitter 100, such as the mapping module 102 or the fragment timing module 106, for example, may be implemented as one or more specialized software components. In other examples, such components may be implemented as one or more specialized hardware components (e.g., specialized firmware components). For instance, the mapping module 102 and the fragment timing module 106 may be composed of an array of logic blocks arranged to perform one or more of the corresponding signal processing operations described herein. Each may implemented by an array of transistors arranged in an integrated circuit that provides a performance and power consumption similar to an ASIC (application-specific integrated circuit), a programmable gate array (PGA), or an FPGA (field-programmable gate array). In certain examples, each may be implemented as an ASIC, PGA, or FPGA. When implemented as specialized hardware components, such components provide the benefit of increased computational and executional speed and efficiency.

Referring to FIG. 2, illustrated is an optical receiver 200 according to various examples discussed herein. FIG. 2 is described with continuing reference to the optical transmitter 100 of FIG. 1. As discussed, the optical receiver 200 may communicate with the transmitter (e.g., the optical transmitter 100 of FIG. 1) to receive a signal waveform at the optical receiver 200 that has been processed to conceal one or more waveform properties of the received signal waveform. The illustrated receiver 200 includes one or more optical elements 202, a demodulator (e.g., the illustrated optical resonator assembly 204), one or more optical-to-electrical converters (OECs) 206*a*, 206*b*, 206*c* (collectively "OECs 206"), one or more analog to digital converters (ADCs) 208*a*, 208*b*, 208*c* (collectively "ADCs 208"), a timing recovery module 210, a phase recovery module 214, and a symbol recovery module 212, among other components. The signal waveform is received by the one or more optical elements 202 and directed to the demodulator. In various examples, the one or more optical elements 202 may include one or more lenses or mirrors, such as an objective lens assembly that is positioned to collect impinging optical radiation and direct the optical radiation at the demodulator. In other examples, such as the described RF implementations, the one or more optical elements 212 may be replaced with receiver components configured to receive an RF signal.

In the illustrated example, the demodulator is an optical resonator assembly 204 that includes three optical resonators 224*a*, 224*b*, 224*c* (collectively "optical resonators 224"). Each optical resonator 224*a*, 224*b*, 224*c* included within the assembly 204 may be an optical etalon, such as a Fabry-Perot etalon. While shown in one example as having three etalons, in various other examples any number of etalons (or other optical resonators) may be used. For instance, the assembly 204 may include a single optical resonator, a pair of optical resonators, or four or more optical resonators. Moreover, in other examples, the demodulator may be a different type of optical demodulator, or an RF demodulator. For instance, the demodulator may be an optical demodulator or an RF demodulator that includes a stable local oscillator or a non-coherent receiver.

As illustrated in FIG. 2, in certain examples, the optical resonator assembly 204 may have three outputs that are collectively indicative of an amplitude (e.g., a magnitude) and a direction (e.g., positive or negative) of a phase modulation of the received signal waveform. In FIG. 2, the amplitude information is encoded in the illustrated amplitude output, a positive phase (+ phase) change indication is encoded in the + phase change output, and a negative phase (− phase) change indication is encoded in the − phase change output. In particular, each of the illustrated optical resonators 224 may correspond to one of these outputs, which may each be an intensity-encoded optical signal.

In various examples, each optical resonator 224*a*, 224*b*, 224*c* of the optical resonator assembly 204 is an optical component capable of sensing variations, such as phase variations, amplitude variations, or frequency variations in a received optical signal. In particular, each optical resonator 224*a*, 224*b*, 224*c* is configured to transform the phase variations in the received signal waveform into an intensity modulation of output optical signal energy. An optical signal received at an optical resonator 224*a*, 224*b*, 224*c* may establish a steady-state energy-conserving condition in which optical signal energy continuously arrives, accumulates or adds to built-up energy existing inside the resonator 224*a*, 224*b*, 224*c*, and emerges from the resonator 224*a*, 224*b*, 224*c* at a constant rate.

A change in the arriving phase, frequency, or amplitude of the optical signal may disrupt the steady-state condition, and the light intensity emerging from the resonator 224*a*, 224*b*, 224*c* is thereby disrupted, until a steady state condition is re-established. Accordingly, the change in phase, frequency, or amplitude of the arriving signal waveform causes a change in intensity of the emerging optical signal. A large phase transition in the arriving signal waveform, for example, causes a large (but temporary) intensity change in the emerging optical signal. Similar operation occurs in an etalon, optical loop, micro-ring, or other optical resonator. Accordingly each optical resonator 224*a*, 224*b*, 224*c* of the assembly 204 functions as a demodulator (or a modulation converter) for the signal waveform. The emerging optical signal from each optical resonator 224*a*, 224*b*, 224*c* may therefore carry the same information content as the arriving signal waveform, but in intensity encoded format.

Each optical resonator 224*a*, 224*b*, 224*c* of the optical resonator assembly 204 is an optical component, such as an etalon, that has a pair of semi-reflective surfaces and has a characteristic resonant frequency associated with a certain wavelength of light based upon the spacing (i.e., dimension) between the semi-reflective surfaces. The semi-reflective surfaces reflect optical signal energy within a corresponding interior of the etalon. An input side allows optical signal energy, such as the received signal waveform, into the interior. An output side forms an optical output to allow a portion of the trapped optical signal energy from the interior to emerge as an output optical signal. Accordingly, the semi-reflective surfaces of the etalon are also semi-transmissive, such that optical signal energy arriving (from the interior) at a semi-reflective surface is partially reflected back to the interior and partially transmitted through to the output side. The etalon may have varying levels of reflectivity of the semi-reflective surfaces. The etalon is one example of a suitable optical resonator in accord with aspects and embodiments described herein.

Use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

As illustrated in FIG. 2, and as previously described, the optical resonator assembly 204 may include a first optical resonator 224*a* that provides the amplitude output, a second optical resonator 224*b* that provides the + phase change output, and a third optical resonator 224*c* that provides the − phase change output. According to certain examples, the use of three optical resonators, one of which may have an effective (roundtrip) length equal to an integer number of wavelengths of the received signal waveform (i.e., a tuned optical resonator), and the others being out of tune with the received signal waveform, are sufficient for demodulation as discussed herein.

In various examples, a comparison of the intensity-encoded outputs of the three optical resonators 224*a*, 224*b*, 224*c* permits the demodulation of a high-order digital modulation scheme, such as QAM. In the illustrated example, the first optical resonator 224*a* is tuned to a resonance frequency and provides the amplitude output, and the second and third optical resonators 224*b*, 224*c* are tuned above and below the resonance frequency and provide the − phase change output and the + phase change output. Accordingly, the amplitude output of the first optical resonator 224*a* indicates the intensity change or magnitude change of a phase change in the receive signal waveform. Moreover, by sampling the second and third optical resonators 224*b*, 224*c*, the direction of the phase changes in the received signal waveform may be determined (e.g., a phase advance or a phase retreat).

For instance, a wavelength that does not create a resonant response in an optical resonator nonetheless establishes an output optical signal. Under such a condition, the optical resonator may be described as being untuned, or detuned, from the particular wavelength. A phase transition arriving at a detuned optical resonator causes a disturbance to the output signal, despite the lack of resonance. The direction of the phase transition (advance or retreat) may be determined by analyzing the output signal intensity from one of the detuned optical resonators (e.g., the second optical resonator 224*b* or the third optical resonator 224*c*). For a positively detuned resonator, an intensity change indicates a positive phase transition and no intensity change (or a very minor intensity change) indicates a negative phase transition. For a negatively detuned optical resonator, an intensity change indicates a negative phase transition and no intensity change (or a very minor intensity change) indicates a positive phase transition. Such operations to detect phase shifts and the magnitude of phase shifts may be performed by the phase recovery module 214 and/or the symbol recovery module 212, as further described herein.

Each output (e.g., each intensity-encoded optical signal) of the optical resonator assembly 204 is directed to a corresponding optical-electrical converter (OEC) 206. Each OEC 206 receives the corresponding output from the assembly 204 and converts the output into an analog electrical signal. In the illustrated example, a first OEC 206*a* receives the amplitude output amplitude and generates an analog amplitude signal, a second OEC 206*b* receives the + phase change output and generates an analog + phase change signal, and a third OEC 206*c* receives the − phase change output and generates an analog − phase change signal. In various examples, each OEC 206 may include a photodetector, such as a photodiode. While shown as physically separated detectors, in other examples, the OEC 206 may include one or more optical elements (e.g., mirrors or lenses) that direct the intensity-encoded optical signals to the same detector or different regions of a single detector.

The analog signal from each OEC 206 is delivered to a corresponding ADC 208 for processing. The ADCs 208 may include any suitable integrated circuit that converts the received analog electrical signal into a corresponding digital signal. In the shown example, the first OEC 206*a* provides the analog amplitude signal to a first ADC 208*a*, the second OEC 206*b* provides the analog + phase change signal to a second ADC 208*b*, and the third OEC 206*c* provides the analog − phase change signal to a third ADC 208*c*. While shown as separate ADCs, in various other examples, the ADCs 208 may implemented as a single ADC with multiple inputs. The ADCs 208 may each be a specialized ADC implemented as an integrated circuit including an arrangement of various logic components. Once each of the analog amplitude signal, analog + phase change signal, and analog − phase change signal are digitized by the corresponding ADC 208, the digital + phase signal and the digital − phase change signal are provided by the corresponding ADCs 208 to the phase recovery module 214. The digital amplitude signal is provided to the symbol recovery module 212. While shown as including the ADCs 208, in various other examples, the ADCs 208 may be omitted, and the phase recovery module 214 and symbol recovery module may perform the operations discussed herein with the analog amplitude signal, analog + phase change signal, and the analog − phase change signal.

As discussed herein, the digital amplitude signal, the digital + phase change signal, and the digital − phase change signal are comprised of a series of "samples," each sample representative of the intensity output of the corresponding optical resonator 224 at a given phase. The phase recovery module 214 determines the phase shift between successive symbols in the signal waveform based on the received digital + phase change signal and digital − phase change signal. As discussed, phase shifts may appear and intensity increases or decreases in the intensity-encoded output signals of the optical resonator assembly 204. Based on the intensity increases or decreases in the + phase change signal and the − phase change signal, the phase recover module 214 is able to detect a phase shift and a direction of a phase shift. However, in various other examples, the particular processes executed by the phase recovery module depends on the particular implementation of the receiver 200, and the particular executed digital modulation scheme.

In an example where the optical receiver 200 receives a signal waveform that is modulated according to an optical BPSK or DBPSK modulation scheme, the phase recovery module 214 may determine the phase shift between successive phase changes based on the symbol transitions in the received signal waveform In an example in which the modulation scheme is a QPSK digital modulation scheme, the phase recovery module 214 recovers the phase information based on the quadrature waveform components of the signal waveform. As illustrated, the output of the phase recovery module 214 is provided to the symbol recovery module 212.

Figure 3:
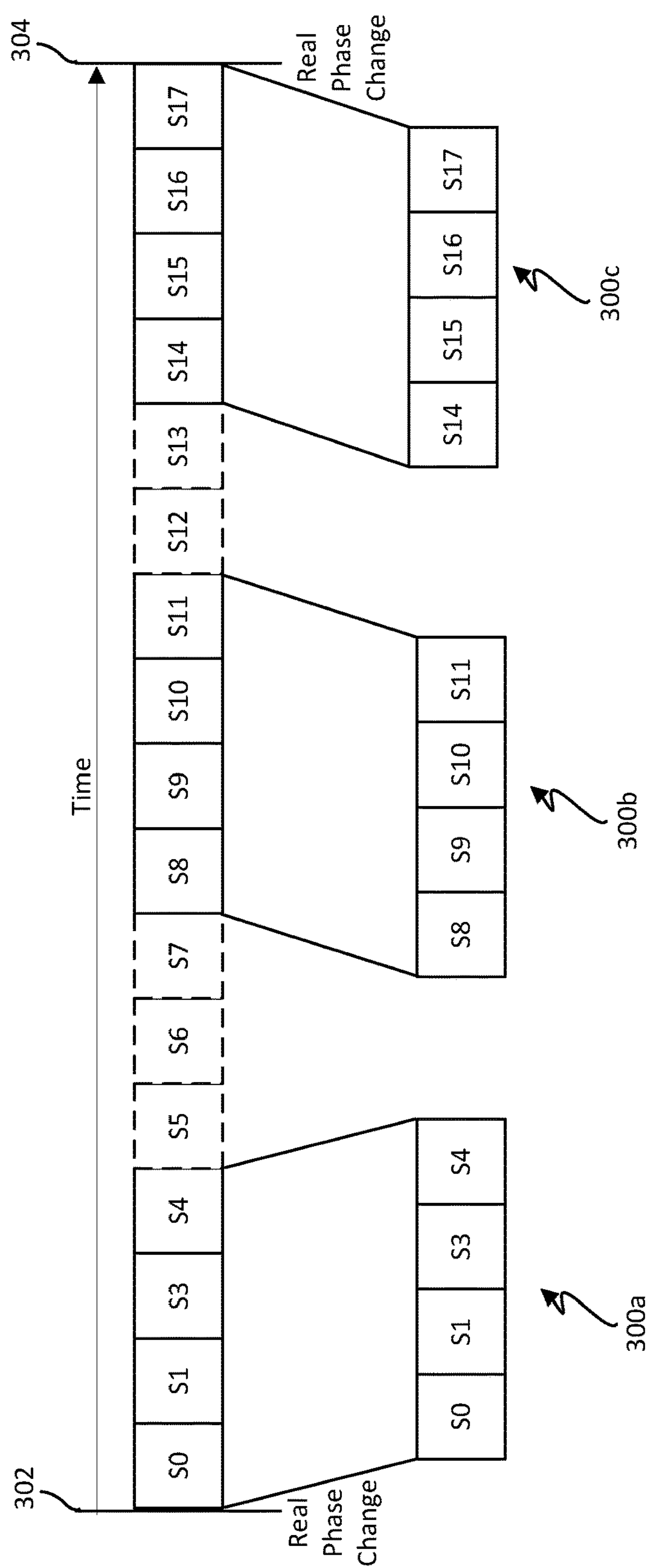
FIG. 3 illustrates a sequence of intensity samples produced by the optical receiver of FIG. 2, and stored in a temporally organized buffer, according to various examples described herein.

In various examples, the symbol recovery module 212 collects the intensity samples (of the digital amplitude signal) between successive phase changes (as detected by the phase recovery module 214) in a temporally organized buffer. For example, FIG. 3 illustrates a sequence of samples (S0-S17) stored in a temporally organized buffer. As described above, in various examples the waveform properties of the signal waveform may be concealed by adjusting a symbol period duration or adding one or more false symbols to the data payload. Accordingly, the stored sequence of samples may include one or more samples introduced to adjust a symbol period duration within the signal waveform (i.e., Time Altering (TA) samples). Accordingly, the illustrated sequence of samples (S0-S17) is shown as including TA samples S5-S7 and TA samples S12 and S13 for the purpose of illustration. The symbol recovery module 212 of FIG. 2 uses one or more inputs from the timing recovery module 210 to identify the additional symbol period duration that maps to the TA samples of the digital amplitude signal. In particular, the timing recovery module 210 may utilize knowledge of the fragment timing data (e.g., from the optical transmitter 100) to identify and remove the TA samples corresponding to the additional symbol time from the intensity samples between successive symbol changes.

As described above with reference to FIG. 1, the fragment timing data may include the particular processes executed by the fragment timing module 106 of the transmitter 100 to aperiodically modulate the signal waveform, and may include data such as the particular duration and placement of false symbols and/or the duration by which a symbol period has been randomly increased. Using the remaining samples, and the recovered digital + phase change and – phase change signals, the symbol recovery module 212 may determine the number of symbols that occurred between the + phase and – phase changes, and the data payload of these symbols (e.g., one(s) or zero(s)). In FIG. 3, three symbols 300*a*, 300*b*, 300*c* are illustrated between the phase changes 302, 304, for the purpose of explanation.

In certain examples, the symbol recovery module 212 may determine whether the additional symbol durations added by the optical transmitter 100 were added in-phase or out-of-phase with a genuine symbol 300*a*, 300*b*, 300*c* of the data payload 108. For instance, additional symbol durations will cause a false phase shift if they are added out-of-phase with a preceding symbol, whereas additional symbol durations will not cause a false phase shift if they are added in-phase with a preceding symbol (when using a DBPSK modulation scheme). Once the TA samples have been removed by the symbol recovery module 212, and phase adjustments are made (as appropriate), the fixed duration symbols 300*a*, 300*b*, 300*c* are identified, and their respective values are recovered.

For example, FIG. 2 illustrates the receiver 200 executing one or more processes to recover the header 112 and the data payload 108 (e.g., data payload of FIG. 1). In particular, FIG. 2 shows the receiver 200 as including a header recovery module 216, and a payload recovery module 218. The header recovery module 216 is coupled to the symbol recovery module 212 and configured to recover the header 112 (as shown in FIG. 1) from the data payload. The payload recovery module 218 is coupled to the header recovery module 216 and configured to recover the data payload, e.g., using the extracted header 112 among other information.

Once the header 112 and the data payload 108 have been recovered, the receiver 200 may apply an FEC code to the data payload to decode the previously FEC encoded data payload. In one example, the receiver 200 includes an FEC decode module 220 that removes redundancy added to the data payload by an FEC encode module (e.g., the FEC encode module 114 discussed with reference to FIG. 1). Once the data payload 108 is decoded, the data payload 108 is provided to a mapping module 222. The mapping module 220 reconstructs the data stream.

For instance, the mapping module 222 may convert the data payload to a series of bits using the digital modulation scheme employed by the mapping module of the transmitter (e.g., mapping module 102 described with reference to FIG. 1) and based on the corresponding constellation representation. For example, when implementing a BPSK digital modulation scheme, the mapping module 222 maps each symbol to a respective bit. However, when implementing other digital modulation schemes (e.g., QPSK digital modulation or QAM digital modulation), the mapping module 222 may map a symbol to more than one bit. As previously discussed, the mapping module 222 may implement various modulation schemes, such as but not limited to BPSK, QPSK, M-ary, and M-PSK, to name a few examples.

As further discussed herein with reference to at least the processor 502 illustrated in FIG. 5, various components of the receiver 200, such as the phase recovery module 214, the symbol recovery module 212, and the timing recovery module 210, for example, may be implemented as one or more specialized software components. In other examples, such components may be implemented as one or more specialized hardware components (e.g., specialized firmware components). For instance, the phase recovery module 214, the symbol recovery module 212, and the timing recovery module 210 may each be composed of an array of logic blocks arranged to perform one or more of the corresponding signal processing operations described herein. Each may implemented by an array of transistors arranged in an integrated circuit that provides a performance and power consumption similar to an ASIC (application-specific integrated circuit), a programmable gate array (PGA), or an FPGA (field-programmable gate array). In certain examples, each may be implemented as an ASIC, PGA, or FPGA. When implemented as specialized hardware components, such components provide the benefit of increased computational and executional speed and efficiency.

Figure 4A:
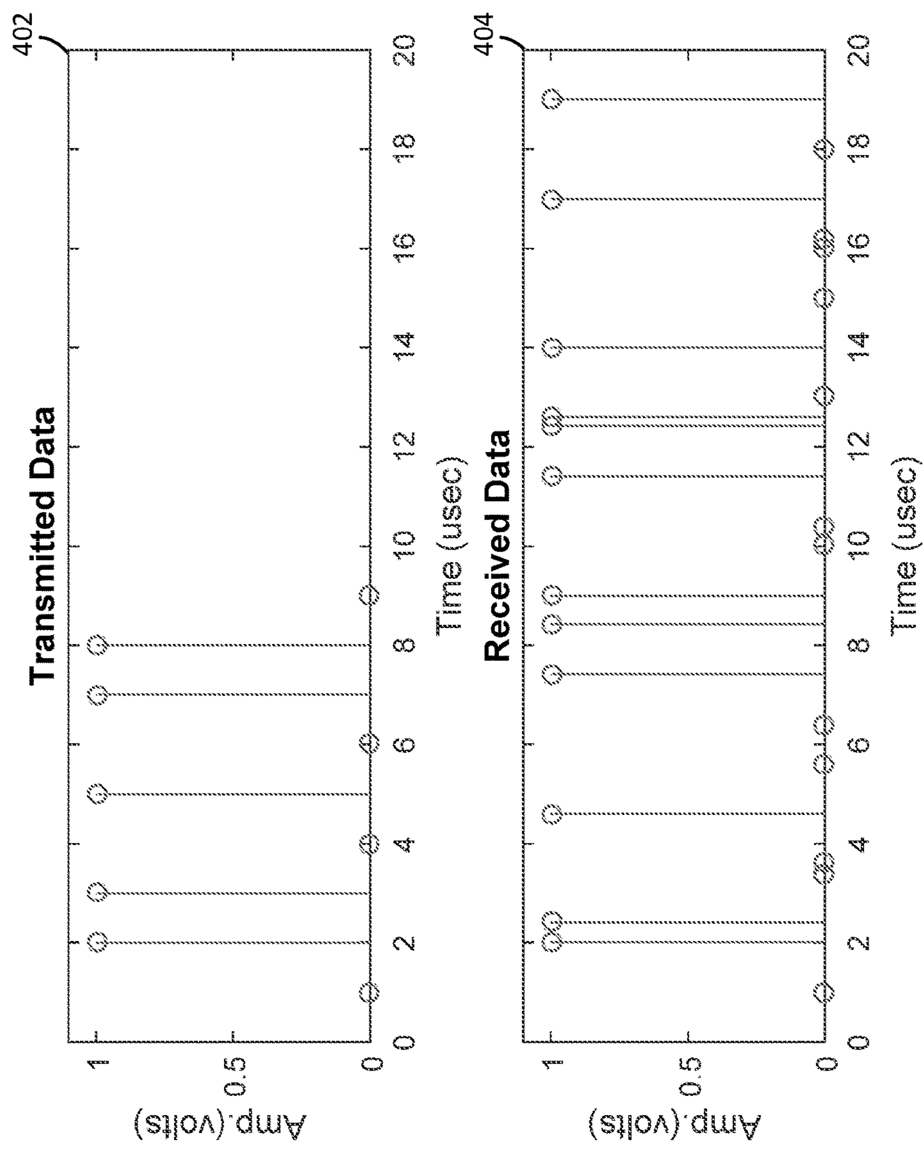
FIG. 4A is a graph set illustrating examples of a data payload and the data payload as collected and demodulated by a conventional receiver after being concealed according to various examples described herein.
Figure 4B:
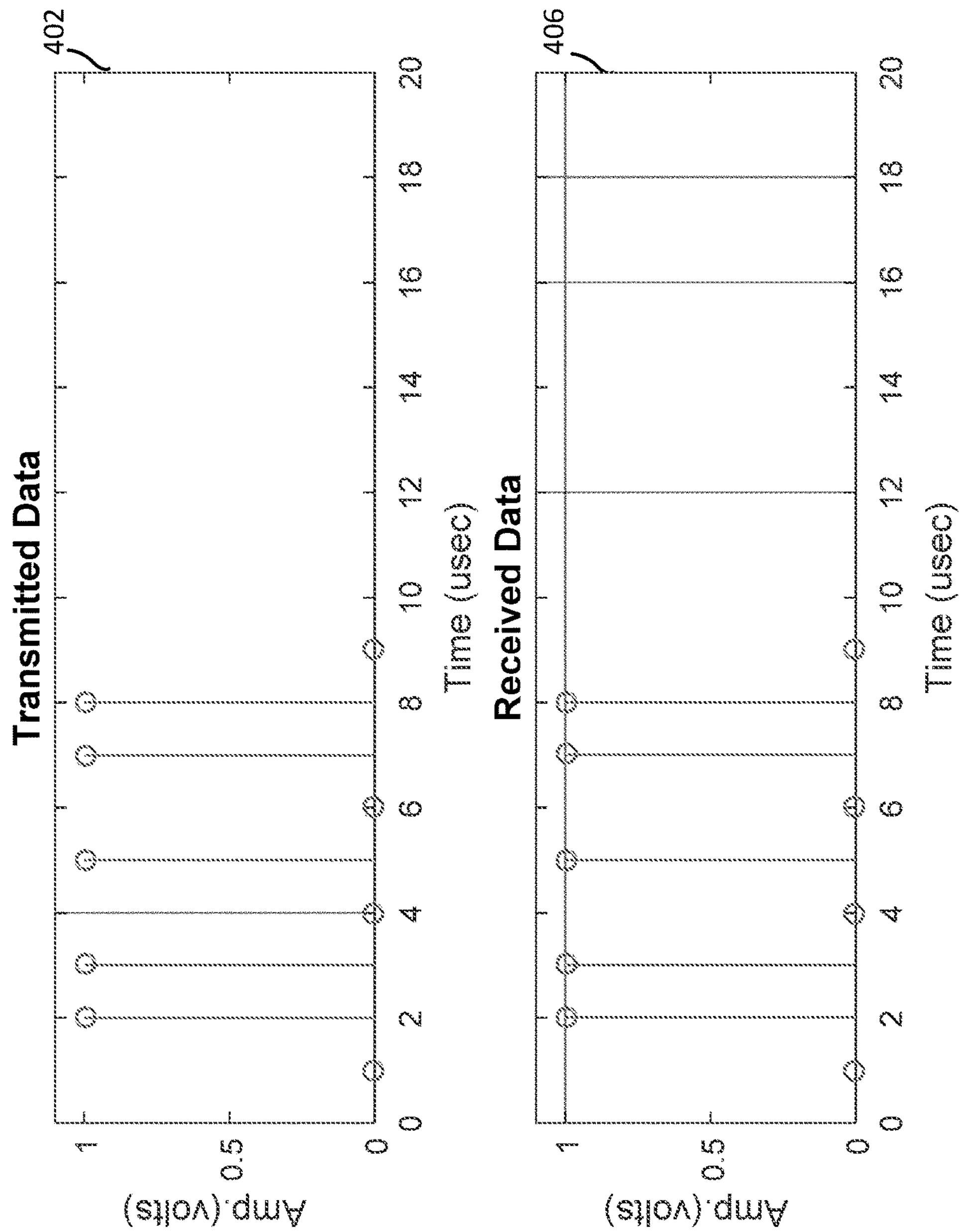
FIG. 4B is a graph set illustrating examples of a data payload and the data payload as collected and demodulated by the optical receiver of FIG. 2, according to various examples described herein.

FIG. 4A is a graph set illustrating examples of a data payload and the data payload as collected and demodulated by a conventional receiver after being concealed according to the various examples described herein. In particular, FIG. 4A illustrates a plot 402 of a data payload to be encoded on a signal waveform, and a plot 404 of the data payload as demodulated by a conventional receiver after being encoded on the signal waveform. As shown in FIG. 4A, discrepancies exist between the plot 402 and the plot 404, indicating that the conventional receiver does not accurately recover the data payload from the concealed signal waveform. In contrast to the plot 404 of FIG. 4A, FIG. 4B illustrates a plot 406 of the data payload as demodulated by the optical receiver 200 illustrated in FIG. 2. In particular, plot 406 illustrates that despite the concealed waveform properties of the signal waveform, the receiver 200 accurately recovers the data payload of plot 402. That is, the plot 402 substantially aligns with the plot 406. Accordingly, various examples of the concealed signal waveform discussed herein may only be detectable by receivers that have knowledge of the processes used to conceal the signal waveform.

As discussed above with reference to FIG. 1, in various examples components of the optical transmitter 100 and/or optical receiver 200 may be implemented as one of, or a combination of, analog circuitry, digital circuitry, one or more specialized hardware components, or one or more microprocessors executing software instructions. In particular software instructions may include digital signal processing (DSP) instructions. FIG. 5 illustrates one example of a control circuit (e.g., a controller 500) that may implement software routines corresponding to the mapping module 102, FEC encode module 102, and/or the fragment timing module 106 illustrated in FIG. 1. The controller 500 may further implement software routines corresponding to the phase recovery module 214, the symbol recovery module 212, the timing recovery module 210, the mapping module 222, the header recovery module 216, the payload recovery module 218, and/or the FEC decode module 220 illustrated in FIG. 2. The controller 500 may include a processor 502, a data storage 504, a memory 506, and one or more interfaces 508, such as a system interface and/or a user interface. While not explicitly illustrated in FIG. 5, in certain examples the controller 500 may be coupled to a power source. The power source delivers power to the one or more components of the controller 500, as well as, other components of the optical transmitter 100 or optical receiver 200.

In FIG. 5, the processor 502 is coupled to the data storage 504, memory 506, and the various interfaces 508. The memory 506 stores programs (e.g., sequences of instructions coded to be executable by the processor 502) and data during operation of the controller 500. Thus, the memory 506 may be a relatively high performance, volatile, random access memory such as a dynamic random access memory ("DRAM") or static memory ("SRAM"). However, the memory 506 may include any device for storing data, such as a disk drive or other nonvolatile storage device. Various examples may organize the memory 506 into particularized and, in some cases, unique structures to perform the functions disclosed herein. These data structures may be sized and organized to store values for particular data and types of data.

The data storage 504 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 502 to perform any of the functions described herein.

In various examples, the controller 500 includes several interface components 508, such as a system interface and a user interface. Each of the interface components 508 is configured to exchange, e.g., send or receive, data with other components of the controller (and/or associated transmitter or receiver), or other devices in communication with the controller 500. According to various examples, the interface components 508 may include hardware components, software components, or a combination of hardware and software components.

In certain examples, components of the system interface couples the processor 502 to one or more components of the optical transmitter 100 shown in FIG. 1, such as the FEC encode module 114, the modulator 104, the mapping module 102, and/or the fragment timing module 106. Similarly, components of the system interface may couple the processor 502 to one or more other components of the optical receiver 200 shown in FIG. 2, such as the OECs 206, the ADCs 208, the phase recovery module 214, the symbol recovery module 212, the timing recovery module 210, the mapping module 222, the header recovery module 216, the payload recovery module 218, and/or the FEC decode module 220. The system interface may provide one or more control signals to the modulator 104, mapping module 102, fragment timing module 106, FEC encode module 114, OECs 206, ADCs 208, phase recovery module 214, symbol recovery module 212, timing recovery module 210, header recovery module 216, payload recovery module 218, FEC decode module 220, and/or the mapping module 222, and may receive one or more responses therefrom. Control signals may manage the operation of such components, as described above.

The user interface may include a combination of hardware and/or software components that allow a corresponding transmitter or receiver in which the controller 500 is incorporated, to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the controller 500. Data received at the various interfaces may be provided to the processor 502, as illustrated in FIG. 5. Communication coupling (e.g., shown interconnection mechanism 510) between the processor 502, memory 506, data storage 504, and interface(s) 508 may be implemented as one or more physical busses in conformance with specialized or standard computing bus technologies.

The processor 502 performs a series of instructions that result in manipulated data that is stored in and retrieved from the data storage 504 or memory 506, as discussed above. In various examples, the series of instructions result in concealing the waveform properties of an encoded carrier wave or recovering the data payload of an encoded carrier wave having one or more concealed waveform properties. Such instructions may correspond to commands for randomly increasing the duration of a symbol period and/or adding one or more false symbols to a data payload, identifying an additional symbol period duration and/or false symbol within a signal waveform, removing one or more TA samples from an amplitude signal corresponding to an identified additional symbol period or false symbol, and/or recovering a data payload, as discussed herein.

The processor 502 may be any type of processor, multiprocessor or controller. For instance, the processor may include a processor manufactured by INTEL, AMD, MOTOROLA, or FREESCALE. In some examples, the processor 502 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

In certain other examples, the processor 502 and/or other components of the controller 500 may be implemented with one or more specialized hardware components. For instance, the processor 502 may be composed of an array of logic blocks arranged to perform one or more of the corresponding signal processing operations described herein. In particular, the processor 502 may implemented by an array of transistors arranged in an integrated circuit that provides a performance and power consumption similar to an ASIC (application-specific integrated circuit), a programmable gate array (PGA), or an FPGA (field-programmable gate array).

Figure 6:
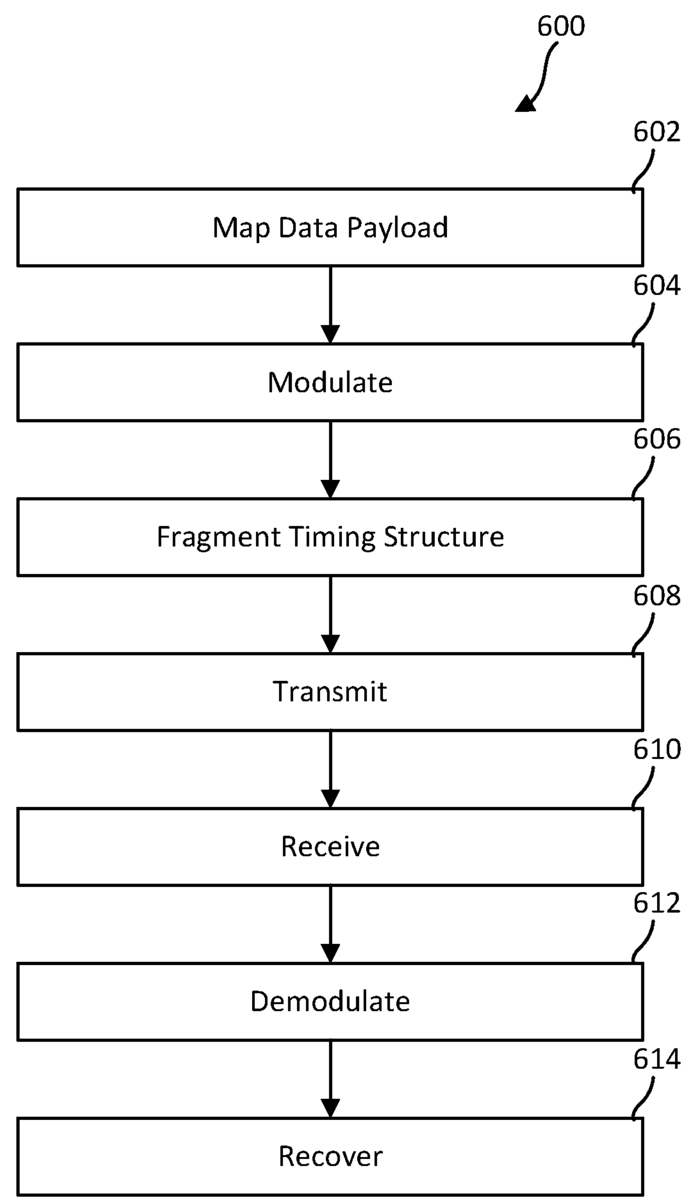
FIG. 6 is a process flow of a method for free-space communication, according to various examples described herein.

As discussed herein, various examples perform processes for improving the security of free-space communications. In some examples, these processes are executed by a transmitter, such as the optical transmitter 100 described with reference to FIG. 1, or a receiver, such as the optical receiver 200 described with reference to FIG. 2. One example of a process for free-space communication is illustrated in FIG. 6. FIG. 6 is described with continuing reference to the optical transmitter 100 of FIG. 1 and the optical receiver 200 of FIG. 2. In various examples, the process 600 may include mapping a data payload to one or more symbols, varying one or more properties of a signal waveform to modulate the signal waveform with the one or more symbols, and fragmenting the timing structure of the signal waveform to conceal one or more waveform properties of the signal waveform. The process 600 may also include transmitting the signal waveform, receiving the signal waveform, demodulating the signal waveform, and recovering the data payload using at least fragment timing data descriptive of the fragmented timing structure.

In act 602 the process 600 may include mapping a data payload to one or more symbols based on a symbol set defined by a digital modulation scheme. For instance, act 602 may include converting each series of bits of a data payload to a symbol set that is specified by the particular modulation scheme implemented by the optical transmitter 100, and converting those symbols to their respective constellation representation. As previously discussed, various modulation schemes may be implemented, such as but not limited to BPSK, QPSK, M-ary, and M-PSK, to name a few examples.

In act 604, the process 600 may include varying one or more properties of a signal waveform to phase modulate the signal waveform with the data payload. The one or more symbols each have a symbol duration that defines the timing structure of the modulated signal waveform. In act 606, the process 600 may include fragmenting the timing structure of the modulated signal waveform to conceal one or more waveform properties of the modulated signal waveform. While in one example, fragmenting the timing structure of the modulated signal waveform includes adjusting the symbol duration of at least one of the one or more symbols, in certain other examples, act 606 may include fragmenting the timing structure of the modulated signal waveform by inserting one or more false symbols in the data payload. Accordingly, in act 606, the process 600 includes aperiodically modulating the coherently encoded signal waveform to remove the symmetry necessary for conventional receivers to detect the signal waveform. Operations performed by the fragment timing module 106 to fragment the timing structure of the modulated signal waveform may be based on an input received from a random number generator, an encryptor, or a predetermined aperiodic timing sequence. As such, in certain examples act 606 may include randomly inserting the one or more false symbols or randomly adjusting the symbol duration of one or more symbols based on the input from a random number generator, an encryptor, or a predetermined aperiodic timing sequence.

In act 608, the process 600 includes transmitting the signal waveform. It is appreciated that in certain examples acts 602-608 may be performed by a transmitter (e.g., the optical transmitter 100 of FIG. 1) while acts 610-614 may be performed by a receiver (e.g., the optical receiver 200 of FIG. 2). However, in other examples, acts 602-614 may be performed by the same device, such as a transceiver including components of both the transmitter 100 of FIG. 1 and the receiver 200 of FIG. 2.

In act 610 the process includes receiving the signal waveform (i.e., the concealed modulated signal waveform). In response to receiving the signal waveform, the process 600 may include converting the modulated signal waveform to an intensity-encoded optical signal (act 612) to demodulate the signal waveform. In certain other examples, the process 600 may include other operations to demodulate the signal waveform. In certain examples, act 612 may include resonating optical signal energy within an optical resonator, and disrupting the intensity of an optical signal output thereof in response to a variation (e.g., a phase change) in the received signal waveform. Accordingly, in at least one example, act 612 includes transforming the variations (e.g., phase changes) in the received signal waveform into an intensity modulation of output optical signal energy. In certain examples, act 612 includes producing multiple intensity-encoded optical signals, a first indicative of an amplitude (e.g., a magnitude) of the modulation of the received signal waveform, and at least a second indicative of a direction (e.g., positive or negative) of the modulation of the received signal waveform.

In act 614, the process 600 may include recovering the one or more symbols and the data payload using at least the intensity-encoded optical signal(s) and fragment timing data descriptive of the fragmented timing structure of the signal waveform. As described above, in various examples the waveform properties of the signal waveform may be concealed by adjusting a symbol period duration or adding one or more false symbols to the data payload (e.g., at the transmitter). Accordingly, in various examples, act 614 may include converting the intensity-encoded optical signal(s) to one or more digital signals consisting of a series of samples that correspond to the intensity output(s) of the described demodulator. Act 614 may include identifying and removing one or more of the samples that correspond to the additional symbol period duration or false symbols, and reconstructing the timing structure of the signal waveform. As described above, the fragment timing data may include a variety of information such as the particular duration and placement of false symbols and/or the duration by which a symbol period has been randomly increased. Once the timing structure has been reconstructed, process 600 may include one or more acts of recovering the value(s) of each encoded symbol.

While not explicitly shown or described with reference to FIG. 6, in various other examples, the process 600 may include additional or alternative acts. Some of these acts are described with reference to the optical transmitter 100 of FIG. 1 or the optical receiver 200 of FIG. 2 and not repeated herein with reference to FIG. 6.

As such, various aspects and examples are generally directed to systems and methods for concealing the waveform properties of an optical or radio-frequency free-space transmission. In particular, examples of the systems and methods described herein aperiodically modulate a coherent signal waveform to remove the symmetry necessary for conventional receivers to detect the signal. As a result of adjustments to the timing of a transmitted signal waveform, an intercepting receiver will incorrectly recover the symbols within the signal waveform, or fail to recover a symbol clock, and therefore, be unable to detect the presence of the signal. Accordingly, various examples of the systems and methods described herein provide an increased level of security for free-space communication that is not available with current systems and techniques.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure.

Accordingly, the foregoing description and drawings are by way of example only, and the scope of the disclosure should be determined from proper construction of the appended claims, and their equivalents.

What is claimed is:

1. A free-space communication method, the method comprising:

mapping a data payload to one or more symbols based on a symbol set defined by a digital modulation scheme;

varying one or more properties of a signal waveform to phase modulate the signal waveform with the data payload, the one or more symbols each having a symbol duration that defines a timing structure of the modulated signal waveform; and fragmenting the timing structure of the modulated signal waveform by adjusting the symbol duration of at least one of the one or more symbols to conceal one or more waveform properties of the modulated signal waveform.

2. The method of claim 1, further comprising receiving an input from at least one of a random number generator, an encryptor, and a predetermined aperiodic timing sequence, and wherein fragmenting the timing structure of the modulated signal waveform includes randomly adjusting the symbol duration of the at least one of the one or more symbols based on the input.

3. The method of claim 1, further comprising transmitting the modulated signal waveform, wherein the modulated signal waveform is an optical transmission.

4. The method of claim 3, further comprising:

receiving the modulated signal waveform;

converting the modulated signal waveform to an intensity-encoded optical signal; and recovering the one or more symbols based at least in part on the intensity-encoded optical signal.

5. The method of claim 4, further comprising converting the intensity-encoded optical signal to a digital signal that includes a plurality of intensity samples, and wherein recovering the one or more symbols includes identifying and removing one or more of the plurality of intensity samples that correspond to the at least one symbol having an adjusted symbol duration.

6. A free-space communication method comprising:

mapping a data payload to one or more symbols based on a symbol set defined by a digital modulation scheme;

varying one or more properties of a signal waveform to phase modulate the signal waveform with the data payload, the one or more symbols each having a symbol duration that defines a timing structure of the modulated signal waveform; and fragmenting the timing structure of the modulated signal waveform to conceal one or more waveform properties of the modulated signal waveform, wherein fragmenting the timing structure of the modulated signal waveform includes inserting one or more false symbols in the data payload.

7. The method of claim 6, further comprising receiving an input from at least one of a random number generator, an encryptor, and a predetermined aperiodic timing sequence, and wherein fragmenting the timing structure of the modulated signal waveform includes randomly inserting the one or more false symbols in the data payload based on the input.

8. The method of claim 6, further comprising transmitting the modulated signal waveform, wherein the modulated signal waveform is an optical transmission.

9. The method of claim 8, further comprising:

receiving the modulated signal waveform;

converting the modulated signal waveform to an intensity-encoded optical signal; and recovering the one or more symbols based at least in part on the intensity-encoded optical signal.

10. The method of claim 9, further comprising converting the intensity-encoded optical signal to a digital signal that includes a plurality of intensity samples, and wherein recovering the one or more symbols includes identifying and removing one or more of the plurality of intensity samples that correspond to the one or more false symbols.

11. A free-space transmitter comprising:

an input configured to receive a data payload;

a mapping module configured to map the data payload to one or more symbols based on a symbol set defined by a digital modulation scheme;

a modulator coupled to the mapping module and configured to vary one or more properties of a signal waveform to phase modulate the signal waveform with the data payload, the one or more symbols each having a symbol duration that defines a timing structure of the modulated signal waveform; and a fragment timing module coupled to the modulator and configured to adjust the symbol duration of at least one of the one or more symbols to fragment the timing structure of the modulated signal waveform to conceal one or more waveform properties of the modulated signal waveform.

12. The free-space transmitter of claim 11, wherein the fragment timing module includes at least one of a random number generator, an encryptor, and a predetermined aperiodic timing sequence, and wherein the fragment timing module is configured to randomly adjust the symbol duration of the at least one of the one or more symbols based on an input from the at least one of the random number generator, the encryptor, and the predetermined aperiodic timing sequence.

13. The free-space transmitter of claim 11, wherein the modulated signal waveform is one of an optical transmission and a radio-frequency transmission.

14. A free-space transmitter comprising:

an input configured to receive a data payload;

a mapping module configured to map the data payload to one or more symbols based on a symbol set defined by a digital modulation scheme;

a modulator coupled to the mapping module and configured to vary one or more properties of a signal waveform to phase modulate the signal waveform with the data payload, the one or more symbols each having a symbol duration that defines a timing structure of the modulated signal waveform; and a fragment timing module coupled to the modulator and configured to insert one or more false symbols in the data payload to fragment the timing structure of the modulated signal waveform to conceal one or more waveform properties of the modulated signal waveform.

15. The free-space transmitter of claim 14, wherein the fragment timing module includes at least one of a random number generator, an encryptor, and a predetermined aperiodic timing sequence, and wherein the fragment timing module is configured to randomly insert the one or more false symbols in the data payload based on an input from the at least one of the random number generator, the encryptor, and the predetermined aperiodic timing sequence.

16. The free-space transmitter of claim 14, wherein the modulated signal waveform is one of an optical transmission and a radio-frequency transmission.

* * * * *